Feb. 5, 1952  D. ALPERT ET AL  2,584,717
METHOD OF FORMING A CAVITY RESONATOR
Filed Nov. 28, 1945  3 Sheets-Sheet 1

INVENTORS
Daniel Alpert, Sidney Krasik
and Theodore Holstein.
BY F. W. Lyle.
ATTORNEY

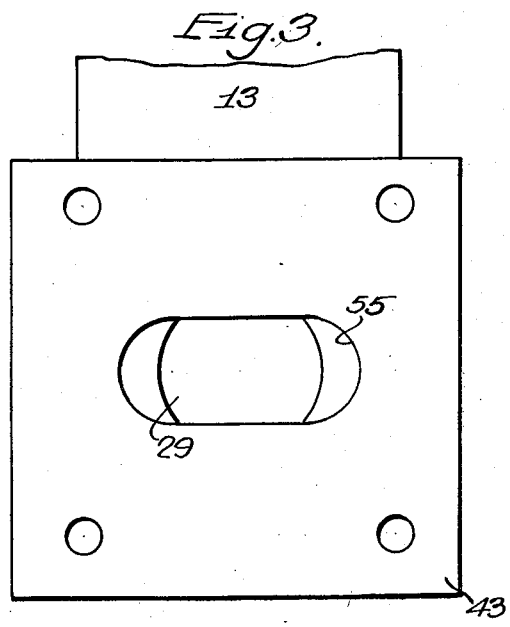
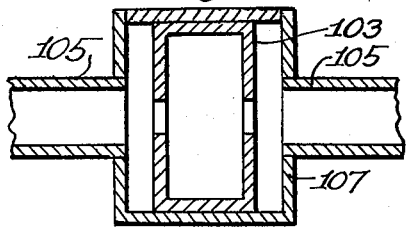
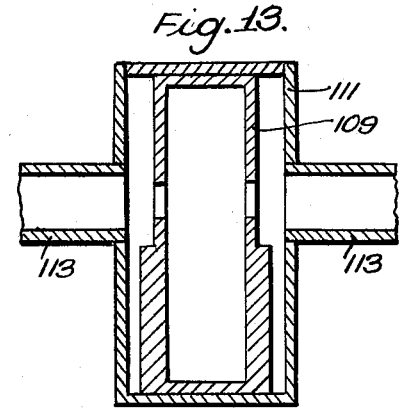
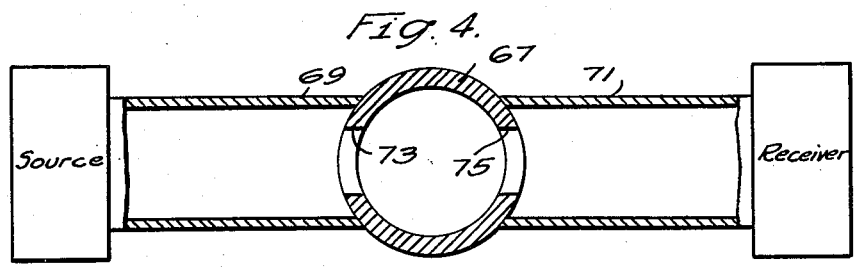
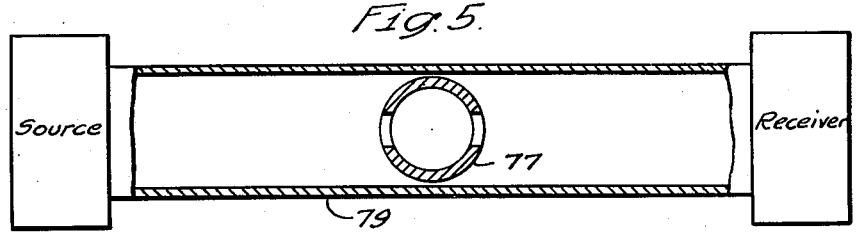

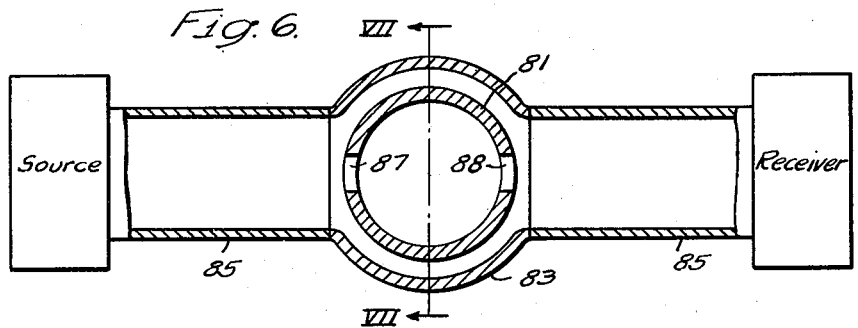
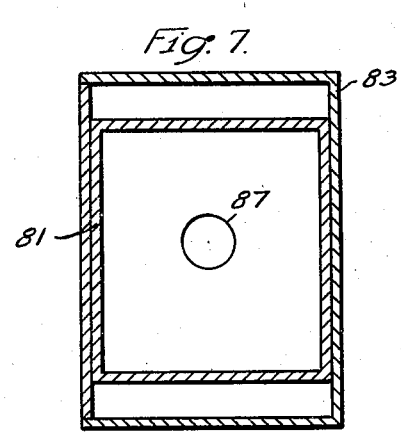
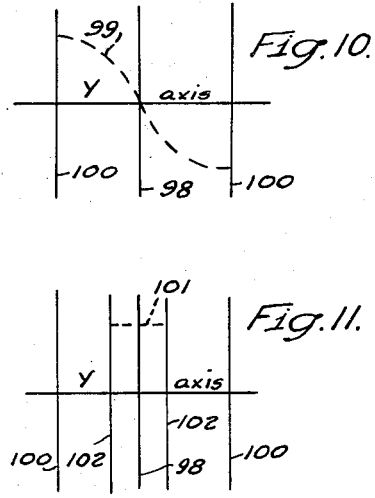
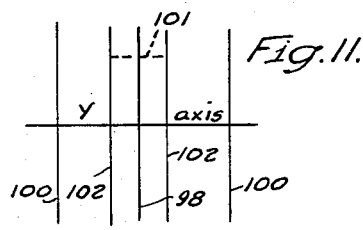
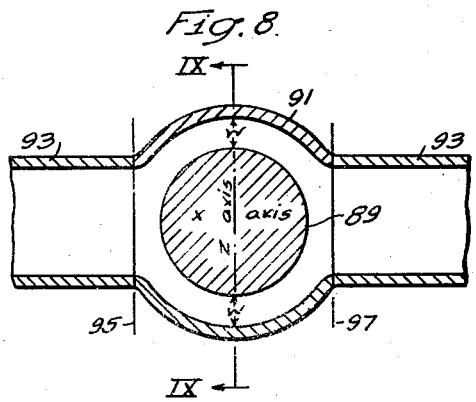
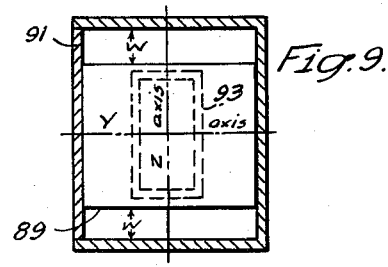
INVENTORS
Daniel Alpert, Sidney Krasik
and Theodore Holstein.
BY
ATTORNEY Patented Feb. 5, 1952

2,584,717

UNITED STATES PATENT OFFICE 2,584,717

METHOD OF FORMING A CAVITY RESONATOR

Daniel Alpert, East Pittsburgh, and Sidney Krasik and Theodore D. Holstein, Pittsburgh, Pa., assignors to Westinghouse Electric Corporation, East Pittsburgh, Pa., a corporation of Pennsylvania Application November 28, 1945, Serial No. 631,398

3 Claims. (Cl. 178—44)

This invention relates to an ultra-high-frequency tube and a support therefor, and it has particular relation to a cavity resonator and a mounting support therefore particularly suitable for use in a hollow wave guide system.

In certain types of ultra-high-frequency electromagnetic wave systems, such as radar systems for use on airplanes, ships, trucks and other mobile equipment, it is highly desirable to maintain the output frequency of a given component at a previously chosen standard frequency. For this purpose, it is desired to have a reference cavity resonator which has a relatively high Q, defined as $2\pi$ times the ratio of energy stored to energy dissipated per cycle, and which resonator will remain tuned to a preselected frequency under any of the external conditions to which such systems are ordinarily subjected in the course of operation thereof.

Cavity resonators employed in this manner in the past are of the non-vacuum type and are subject to many difficulties. The resonators cannot be permanently preset at the factory prior to installation in the system and do not remain tuned to the selected frequency.

It is accordingly an object of our invention to provide new and improved cavity resonator apparatus which will remain tuned to a preselected frequency.

Another object of our invention is to provide a new and improved cavity resonator apparatus which may be tuned to a preselected frequency at the factory and will remain so tuned through installation and use of the apparatus in an ultra-high-frequency electromagnetic wave system.

Our invention arises from the realization that since the prior art cavity resonators employed for this purpose are open to air, they are subject to change in both the Q thereof and the frequency to which they are tuned because of variations in pressure, humidity and surface conditions such as dirt and dust. Moreover, thermal variations cause a frequency drift of zero position as well as changes in the reading at high temperatures. Our invention also arises from the realization that variations in the tuning of the prior cavity resonators resulted from mechanical distortions produced in mounting and handling of the apparatus and by the vibration thereof in use.

In accordance with our invention, we provide a cavity resonator which may be accurately tuned to a preselected frequency and which will remain so tuned under variations in pressure, humidity and temperature. In addition, we provide a new arrangement for supporting or mounting a cavity resonator which eliminates any mechanical distortion thereof which might be produced in the normal handling, mounting and use of the apparatus.

The features of our invention which we consider novel are set forth with more particularity in the accompanying claims. The invention itself, however, together with additional objects and advantages thereof, may be better understood from the following description of specific embodiments when read in connection with the accompanying drawings, in which:

Fig. 3 is a view taken along line III—III of Fig. 2;

Fig. 4 is a diagrammatic sketch showing schematically the usual manner of mounting a cavity resonator in a hollow wave guide system prior to our invention;

Figs. 5 and 6 are partial sectional views of simple apparatus showing the manner of mounting a resonator in accordance with our invention;

Fig. 7 is an enlarged view taken along line VII—VII of Fig. 6;

Fig. 8 is a diagrammatic sectional view of a wave guide system used in explaining the operation of the mounting arrangement shown in Figs. 5 through 7;

Fig. 9 is a view along line IX—IX of Fig. 8;

Figs. 10 and 11 are graphs used in the explanation of Fig. 8; and

Figs. 12 and 13 are partial sectional views of a modification of the apparatus of Fig. 6.

Figure 2:
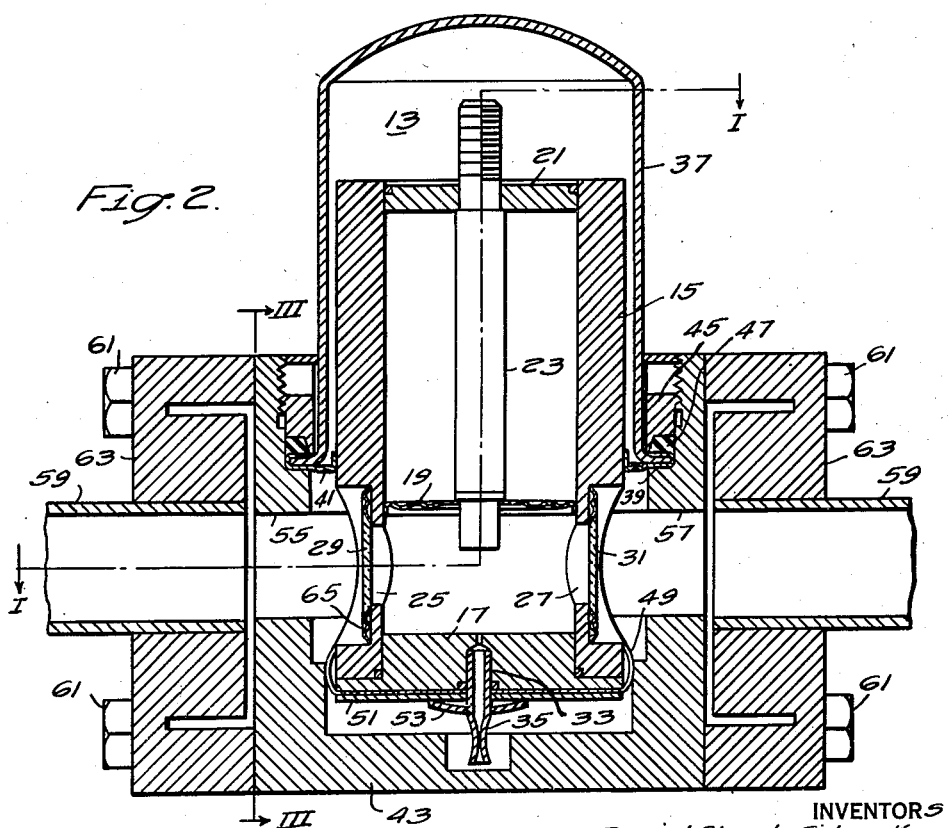
Fig. 2 is a sectional view taken along the line II—II of Fig. 1, the latter having been taken along the line I—I of Fig. 2.

As shown in the drawings, a high-frequency tube 13 is provided which includes a body formed of a hollow circular cylinder 15 of a highly conductive material, such as copper, and an end plate 17 of the same or similar material across one end of the cylinder as seen in Fig. 2. A flexible diaphragm 19 is secured across the interior of the cylinder 15 intermediate the ends thereof. The flexible diaphragm 19, together with the cylinder 15 and end plate 17, forms a cavity resonator within the cylinder between the diaphragm and the end plate.

A tuning plate 21 of a suitable material is rigidly secured across the upper end of the cylinder 15, and its center is rigidly interconnected with the center of the diaphragm 19 by a rod 23 extending therebetween. The upper end of rod 23 extends through an opening in the center of tuning plate 21 with the plate resting on and secured to a shoulder on the rod. The lower end of the rod 23 extends through an opening in the center of the diaphragm 19, which is secured to a shoulder on the rod, to provide a re-entrant portion for the cavity resonator.

A pair of openings 25 and 27 are provided in the cylinder 15 through which electromagnetic waves may be transmitted into and out of the cavity resonator. Across each of these openings 25 and 27 is mounted metal-supported glass windows 29 and 31, respectively, which is vacuum-tight. Additional details as to the construction of these windows may be found in the copending application of Daniel Alpert, Serial No. 631,399, filed November 28, 1945.

Tuning of the cavity resonator begins before the tuning plate 21 is rigidly secured in place. The resonator is coupled to suitable frequency measuring apparatus. Then with the diaphragm 19 and rod 23 in place, the tuning plate 21 is mounted on the upper end of the rod 23 and against the shoulder thereon and is moved by suitable means to deform the diaphragm 19 and change the tuning of the resonator. By such movement of the tuning plate 21 and rod 23, the resonator is tuned to a frequency but a few megacycles away from the exact frequency desired so that only a slight additional deformation of the diaphragm 19 is required, preferably in a downward direction, to tune the resonator to the exact frequency desired. At this point the tuning plate 21 is rigidly secured to the cylinder 15 as by soldering.

After the tuning plate 21 is soldered to the cylinder 15, the body is evacuated by a suitable vacuum pump connected to a small metal tube 33 fitting within a small opening in the end plate 17. A small hole (not shown) in the diaphragm 19 permits the body to be evacuated not only as to the resonator below the diaphragm but also as to the space between the diaphragm and tuning plate. After evacuation the tube 33 is sealed as at 35. Thereafter the tuning plate 21 receives a plastic deformation sufficient to effect tuning of the resonator to the exact frequency desired by means of an external force applied near the center thereof. The tuning plate is preferably made of a suitable material which retains the plastic deformation, such as copper. In a typical case, the plastic deformation amounts only to a displacement of the order of .001 to .002 inch in the position of the center of a tuning plate of 5/8 inch diameter. In tubes constructed in accordance with Figs. 1, 2 and 3, it has been found that the cavity resonator may be tuned in this manner with an accuracy limited only by present frequency measuring equipment.

It is well-known that in any tuning arrangement in which a movable member is to be adjusted to effect tuning and then secured in place at the selected position with only a small movement being required to effect an appreciable change in tuning, the actual securing in place of the member usually causes sufficient movement thereof to detune the apparatus by an appreciable amount. Consequently, such arrangements usually include expensive movement reduction apparatus. In the present arrangement, however, accurate tuning is possible without movement reduction apparatus and may be easily performed on a large scale production basis.

A protective cap 37 is provided which surrounds the upper part of cylinder 15 and extends over the tuning plate 21 to prevent possible distortion thereof by outside sources. The cap 37 has an annular flange 39 at its lower end which is clamped in a special support described hereinafter, the cylinder 15 being supported from the cap by a flexible annular member 41 connecting and sealing the cap to the cylinder.

Because of the nature of the tube any appreciable effect of changes in ambient pressure on the tube would, without the cap 37, be through distortion of the tuning plate. Consequently, with the cap 37 sealed to the cylinder 15, the cap prevents changing of the tuning of the resonator by distortion of the tuning plate by either an external mechanical force or by changes in ambient pressure.

For the chamber between the diaphragm 19 and the end plate 17 to function as a resonator the surface of the inner walls thereof must be highly conductive. Consequently, the body of the tube comprising the cylinder 15 and end plate 17, as well as the diaphragm 19 is preferably made of copper or other highly conductive material. However, with temperature changes the body expands or contracts. With an increase in temperature, the size of the resonator chamber increases and the tuning tends to be changed to a lower frequency. Therefore, the rod 23 is made of a material having a low coefficient of expansion such that with expansion of the body the diaphragm 19 is moved upward by an amount sufficient to maintain the tuning of the resonator constant. In a tube having the approximate proportions shown in Fig. 2, in which the body is of copper, it has been found that a rod 23 of Invar effects substantially complete temperature compensation to maintain the tuning of the cavity resonator at a preselected frequency with temperature changes over a range of from about −10° C. to about +100° C.

It is to be noted that while it is not necessary for the rod 23 to extend through the diaphragm 19 to provide a re-entrant portion for the resonator, such an arrangement is believed to be highly advantageous. The portion of rod 23 which extends into the resonator is coated with a highly conductive material, such as copper plating, and, as is well known to those skilled in the art, permits a smaller resonator for a given frequency. This is of particular advantage in the special mounting arrangement described hereinafter.

Another advantage in extending rod 23 into the resonator is that it increases the rate of frequency change per unit of vertical movement of the rod. For example, in a tube constructed in accordance with Figs. 1, 2 and 3, the rate of frequency change was increased from 2 megacycles per mil of vertical movement of the rod when that rod did not extend through the diaphragm, to 10 megacycles per mil of vertical movement when the rod extended into the resonator as shown in the drawing. This feature is important in connection with the temperature compensating arrangement, inasmuch as it reduces the amount of movement of the diaphragm required to avoid changes in the tuning of the resonator with temperature changes. As a result, the length of rod 23 may be kept shorter if a portion thereof extends into the resonator and, therefore, the height of the cylinder 15 above the diaphragm does not have to be as great as otherwise.

It is also to be noted that the body is evacuated not only in the chamber to be employed as a cavity resonator but also in the space above the diaphragm. Thus no air or other gas is present to expand or contract and thereby deform the diaphragm in response to ambient temperature changes.

A special support is provided whereby the tube may be mounted in a suitable system such as a hollow wave guide system. The support is shown as a square, generally cup-shaped block 43 within which the tube is mounted. The flange 39 of the protective cap 37 extends radially outward from the tube and rests upon a shoulder within the block 43 and is clamped thereon by means of a nut 45 threadedly interconnected with the block. A gasket 47 of a suitable material, such as synthetic rubber, is located between the nut 45 and the flange 39 of the cap 37.

With the cap 37 clamped to the block 43, a flexible mounting ring 49 positioned about the lower end of the cylinder 15 engages the inner wall of the block. Thus, the body of the tube is supported non-rigidly within the block 43 by the flexible annular member 41 above the resonator and the flexible mounting ring 49 below the resonator. The flexible ring is preferably formed of a single cup-like piece of spring material, the sides of which are split to give flexibility, mounted over the lower end of the cylinder 15 and held in place by a plate 51 and nut 53.

The block 43 has a pair of openings 55 and 57 therein aligned with the windows 29 and 31, respectively, of the resonator and is adapted to have a section of a hollow wave guide 59 of rectangular cross-section clamped to the block in alignment with each of the openings therein. The clamping of each wave guide section 59 to the block 43 may be easily accomplished by means of bolts 61 through flanges 63 secured on the end of the guide with a quarter wave length choke at the interface between the flange and the block.

Figure 1:
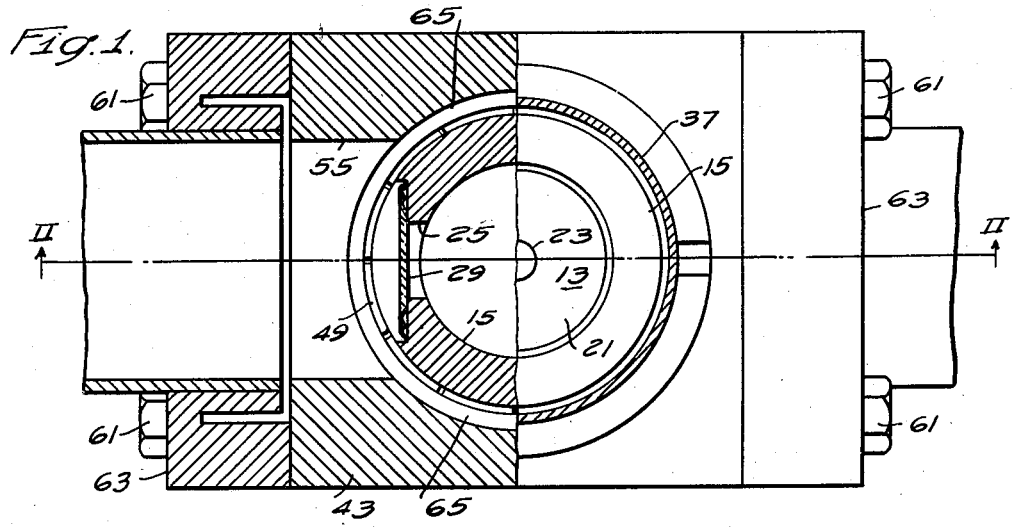
Figure 1 is a plan view, partially in section, of our invention as applied to a hollow wave guide system.

It is apparent that with the mounting arrangement described, the mechanical stresses and strains ordinarily associated with installing a tube in the hollow wave guide system as well as those caused by vibration and by thermal expansion and contraction of other parts of the system are not applied to the resonator itself but are absorbed by the block and the flexible supports between the block and the body of the tube. In obtaining such non-rigid support of the tube, an annular dielectric path 65 is provided within the block 43 about the outside of the resonator from one section of the guide 59 to the other, as seen in Fig. 1. However, one aspect of our invention arises from the realization that the dielectric path may be arranged so that electromagnetic energy from one section of the guide cannot be transmitted about the outside of the resonator through the path but can only be transmitted from one guide section to the other through the resonator itself. This is explained hereinafter in connection with Figs. 4 through 9.

The usual arrangements for mounting or supporting a cavity resonator in a hollow wave guide system so that energy transmitted from one portion of the guide to the other is transmitted primarily through the resonator have one common feature. This is the provision of a connecting dielectric region between the two sections of wave guide only through the resonator itself. All dielectric paths around the outside of the resonator are blocked off by metallic conductors. Such arrangements often impose very severe mechanical restrictions on the design of the resonator and impair its performance since it must be rigidly joined to metal surfaces all about two complete regions of its periphery. Such an arrangement is shown in Fig. 4 where the hollow body 67 of a cavity resonator is rigidly secured to the ends of two wave guides 69 and 71 on opposite sides thereof. Consequently, the very act of securing the body 67 to the guides 69 and 71 tends to distort the body 67, and further distortion and shock is transmitted to the body 67 from other points in the system by means of the guides. For example, thermal expansion of the guides themselves may place a considerable strain upon the body 67 rigidly secured therebetween. Windows 73 and 75 are provided in the body 67 so that all of the energy passing from guide 69 to guide 71 is transmitted through the interior of the body.

In Fig. 5 is shown the position of a cylindrical cavity resonator 77 mounted in accordance with our invention in a rectangular wave guide 79, where the outside dimension of the resonator is less than the large dimension of the guide 79.

In Figs. 6 and 7 is shown a cylindrical cavity resonator 81 mounted in a support 83 between two sections of a rectangular wave guide 85 in accordance with our invention where the diameter of the resonator is greater than the large dimension of the guide. Windows 87 and 88 permit transmission of energy through the resonator. The resonator 81 is supported by fitting within the support 83 across the dimension parallel to the short side of the guide which is somewhat similar to the supporting arrangement in Fig. 2. A similar supporting arrangement may also be used for the resonator of Fig. 5. In any event, there is a dielectric connection between the two wave guide sections about the ouside of the resonator and it is necessary to avoid any substantial transmission of energy through this outside dielectric connection.

For purposes of consideration of the transmission of energy around the outside of the resonator, we may consider the resonator as a metal plug 89 in a support 91 interposed in a guide 93 as shown in Figs. 8 and 9 with the region outside the plug considered as a wave guide. The region to be considered is the annular space between planes represented at 95 and 97 of Fig. 8. The extent to which this region will transmit energy as a wave guide depends upon the degree of coupling of a particular mode of the electromagnetic waves in this annular space to the mode used in the main guide 93 and the cut-off frequency of a particular mode in this annular space compared to the frequency band being used. Moreover, for transmission of energy through the annular space, it is known from the general theory of wave guides that there are two types of modes, E and H, referring respectively to those which do or do not have a component of electric field in the direction of propagation.

In considering the cutoff frequency, it is known that the transmission of the lowest H mode requires that the width of the annular space shown as the dimension W in Figs. 8 and 9 must be at least one-half a wave length in free space. Thus, by making W considerably less than one-half wave length in free space, no energy will be transmitted in an H mode without extremely large attenuations. The actual amount of attenuation depends, of course, on how small W is made with respect to the wave length in free space. For practical purposes, it is quite feasible to reduce the dimension W to a value sufficiently less than one-half a wave length in free space as to substantially eliminate any transmission of energy in the H modes from one section of wave guide 93 to the other about the outside of the plug 89.

The cutoff frequency of the E modes is determined by at least two dimensions. In the first place, energy may be transmitted in the E modes if the circumference of the mean diameter of the annular space about the plug 89 in Fig. 8 is greater than the free space wave length. Actual determination of the cutoff frequency of a particular E mode may be made by well-known wave guide theory from this mean diameter and the height of the annular space in the direction of the Y axis of the guide, where the Y axis is parallel to the short side of the rectangular guide, with the Z axis parallel to the wide side, and the X axis parallel to the longitudinal axis of the guide. There are a double infinity of E modes, one set relating to the number of zero points in the field about the mean diameter, and the other set relating to the number of zero points of the Z component of the field in the direction of the Y axis. The E mode which has the lowest cutoff frequency and is, therefore, most troubltsome in the present case, is that having two zero points along the mean diameter and one zero point of the Z component of the magnetic field in the direction of the Y axis. It is usually extremely difficult to make the dimensions of the outside of the resonator so small that this lowest E mode is beyond cutoff, although the higher E modes may be made far beyond cutoff without troublesome mechanical problems. Although in some cases the dimensions may be beyond cutoff, in many other cases it becomes necessary to eliminate the lowest E mode by some other method.

In further considering the elimination of the lowest E mode, the graph of Fig. 10 shows the variation of the Z component of magnetic field in the direction of the Y axis for this mode in the annular space. It is to be noted that the Z component of the field indicated by curve 99 is anti-symmetric about a plane through the center of the guide perpendicular to the Y axis as represented by line 98. Lines 100 correspond to the ends of the support 91. On the other hand, the graph of Fig. 11 shows, by curve 101, the nodal field about the Y axis in the main wave guide itself, lines 102 corresponding to the wide sides of the guide. It is, therefore, proposed to make the annular space substantially symmetrical with respect to a plane through the center of the guide perpendicular to the Y axis. With such an arrangement, energy in the lowest E mode from the main guide tends to excite a field on the annular space on one side of the plane but opposes that field on the other side of the plane and because of the symmetry with respect to the plane transmission of energy through the annular space in the lowest E mode is substantially eliminated.

In conformity with the foregoing discussions, transmission of energy from one section of the wave guide to the other through the space about the outside of the resonator is substantially prevented in the arrangements of Figs. 1, 5 and 6 by making the space symmetrical with respect to a plane through the center of the guide perpendicular to the Y axis thereof and the dimensions of the space below that dictated by the cutoff frequency of the lowest H mode and the E modes of the electromagnetic waves other than the lowest E mode in which the Z component of the magnetic field is anti-symmetric with respect to the Y axis of the guide. Consequently, the energy is transmitted through the resonator.

In an arrangement actually constructed in accordance with Figs. 1, 2 and 3, it has been found that the leakage of energy around the outside of the resonator is of the order of 50 decibels below direct wave guide coupling over a frequency band of 12 percent with no more than ordinary mechanical tolerances. The coupling of the windows has been found to be the same as in the prior mounting arrangements and no appreciable power losses due to this special mounting have been detected.

It is to be noted that the requirement of symmetry in the space about the outside of the resonator is only of symmetry with respect to the plane through the center of the guide perpendicular to the Y axis thereof in an electrical sense. Consequently, the mechanical variations possible in mounting a resonator in a wave guide system are quite large. As shown in Fig. 12, the dimension of a resonator 103 along the Y axis may be much larger than that of the wave guide 105 itself, being mounted in a support 107. Moreover, as shown in Fig. 13, the radial clearance between a resonator 109 and its support 111 in a guide 113, may be less on one side of the center plane of the guide perpendicular to the Y axis than on the other. To avoid transmission of energy about the resonator, it is only necessary to make the first side longer mechanically than the second to provide the same effective electrical symmetry. Such an increase in proportional length on one side may be usefully employed to give increased mechanical tolerances.

It is to be understood that other suitable supporting arrangements may be used for various purposes and so long as the requirements as to cutoff frequency and symmetry are met, transmission of energy about the resonator may be substantially avoided.

Although the tube described herein and shown in Figs. 1, 2 and 3 may be usefully employed without the special support shown, it is apparent that the tube and support together provide an arrangement for maintaining a preselected constant frequency output even though subjected to variations in temperature, pressure and humidity and to mounting and installation shocks and strains as well as vibration and other shocks encountered in the operation and use of the apparatus.

The term "resonator" as used herein refers to a chamber having walls of electrically conducting material and adapted to sustain ultra-high frequency electromagnetic oscillations.

While we have shown and described certain embodiments of our invention, we are aware that many other modifications thereof may be made without departing from the spirit of the invention. We do not intend, therefore, to limit our invention to the specific arrangements shown and described.

We claim as our invention:

1. The method of forming a cavity resonator intended to have a resonant frequency which is substantially independent of temperature variations of its walls which comprises forming a cylinder of one metal provided with a closure for one end, fixing in position at a point substantially displaced from the other end of the cylinder a flexible diaphragm attached at its periphery to the cylinder wall and provided with a cylindrical center post coaxial with the cylinder axis and projecting through said other end of said cylinder, said center post having affixed to it a plastically deformable metal plate of dimensions suitable to close said other end of said cylinder, attaching the rim of said plate to the walls of said cylinder adjacent said other end and forcibly deforming said plate by the amount necessary to displace said flexible diaphragm to the position which tunes the cavity between it and the first-mentioned end of said cylinder to the resonant frequency desired.

2. The method of forming a cavity resonator intended to have a resonant frequency which is substantially independent of temperature variations of its walls which comprises forming a cylinder of one metal provided with a closure for one end, fixing in position at a point substantially displaced from the other end of the cylinder a flexible diaphragm attached at its periphery to the cylinder wall and provided with a cylindrical center post coaxial with the cylinder, said center post being of a different material from the walls of said cylinder and said center post having affixed to it a plastically deformable metal plate of dimensions suitable to close said other end of said cylinder, attaching the rim of said plate to the walls of said cylinder adjacent said other end and forcibly deforming said plate by the amount necessary to displace said flexible diaphragm to the position which tunes the cavity between it and the first-mentioned end of said cylinder to the resonant frequency desired.

3. The method of forming a cavity resonator intended to have a resonant frequency which is substantially independent of temperature variations of its walls which comprises forming a vessel of metal walls, said vessel being provided with a closure for one end, fixing in position at a point substantially displaced from the other end of the vessel a flexible diaphragm attached at its periphery to the vessel wall and provided with a center post extending through said vessel, said center post having affixed to it a plastically deformable metal plate of dimensions suitable to close said other end of said vessel, attaching the rim of said plate to the walls of said vessel adjacent said other end and forcibly deforming said plate by the amount necessary to displace said flexible diaphragm to the position which tunes the cavity between it and the first mentioned end of said vessel to the resonant frequency desired.

DANIEL ALPERT.
SIDNEY KRASIK.
THEODORE D. HOLSTEIN.

REFERENCES CITED

The following references are of record in the file of this patent:

UNITED STATES PATENTS

| Number | Name | Date |
| --- | --- | --- |
| 2,109,880 | Dow | Mar. 1, 1938 |
| 2,129,714 | Southworth | Sept. 13, 1938 |
| 2,374,810 | Fremlin | May 1, 1945 |
| 2,404,086 | Okress | July 16, 1946 |
| 2,409,321 | Stephan | Oct. 15, 1946 |
| 2,413,364 | McCarthy | Dec. 31, 1946 |
| 2,415,962 | Okress | Feb. 18, 1947 |
| 2,423,396 | Linder | July 1, 1947 |
| 2,427,089 | Clifford | Sept. 9, 1947 |
| 2,454,761 | Barrow | Nov. 30, 1948 |